United States Patent
Moore et al.

[11] Patent Number: 5,929,382
[45] Date of Patent: *Jul. 27, 1999

[54] WIRE HARNESS ASSEMBLY

[75] Inventors: Nathan Moore, Dearborn; Richard Chutorash, Rochester Hills, both of Mich.

[73] Assignee: UT Automotive Dearborn, Inc., Dearborn, Mich.

[*] Notice: This patent is subject to a terminal disclaimer.

[21] Appl. No.: 08/934,032

[22] Filed: Sep. 19, 1997

[51] Int. Cl.⁶ .................................................. H01B 7/08
[52] U.S. Cl. .................................. 174/72 TR; 174/72 R; 174/72 A
[58] Field of Search ................................ 174/70 R, 72 A, 174/72 C, 135, 71 R, 72 R, 72 TR

[56] References Cited

U.S. PATENT DOCUMENTS

| | | |
|---|---|---|
| 2,931,851 | 4/1960 | Sims . |
| 3,210,032 | 10/1965 | VanSlyke . |
| 3,896,259 | 7/1975 | Fry ........................................ 174/72 A |
| 4,065,199 | 12/1977 | Andre et al. . |
| 4,478,544 | 10/1984 | Strand ....................................... 411/34 |
| 4,591,203 | 5/1986 | Furman . |
| 4,761,871 | 8/1988 | O'Connor et al. ...................... 29/432.1 |
| 4,824,164 | 4/1989 | Nakayama et al. . |
| 4,907,836 | 3/1990 | Ueda et al. . |
| 4,918,261 | 4/1990 | Takahashi et al. . |
| 5,160,812 | 11/1992 | Takahashi et al. . |
| 5,339,491 | 8/1994 | Sims . |
| 5,368,802 | 11/1994 | Wanha . |
| 5,390,882 | 2/1995 | Lee et al. . |
| 5,445,436 | 8/1995 | Kemnitz . |
| 5,460,530 | 10/1995 | Toba et al. ................................. 439/34 |
| 5,523,532 | 6/1996 | Leonelli et al. ...................... 200/61.54 |
| 5,535,511 | 7/1996 | Karasik . |
| 5,573,299 | 11/1996 | Masuda . |
| 5,615,851 | 4/1997 | LeBeau . |

FOREIGN PATENT DOCUMENTS

| | | |
|---|---|---|
| 3738249 | 5/1988 | Germany . |
| 29510148 U | 9/1995 | Germany . |
| 2052181 | 1/1981 | United Kingdom . |

OTHER PUBLICATIONS

Patent Abstracts of Japan vol. 095, No. 002, Mar. 31, 1995 and JP 06 314518 A (Sumitomo Wiring Syst Ltd.), Nov. 8, 1994.

*Primary Examiner*—Kristine Kincaid
*Assistant Examiner*—Mark Olds
*Attorney, Agent, or Firm*—Emch, Schaffer, Schaub & Porcello Co., L.P.A.

[57] ABSTRACT

This assembly is for attaching wire harnesses such as flat wire harnesses together. Preferably, the flat wire harnesses then are attached to a motor vehicle interior trim panel or to the vehicle's body. The assembly includes a plurality of wire harnesses, each wire harness having at least one aperture therethrough, the plurality of wire harnesses having a first surface and a second surface with the plurality sandwiched therebetween, and at least one Christmas tree retainer passing through an aperture of each wire harness in the plurality of wire harnesses, the retainer having a Christmas tree section extending beyond the first surface and a post end extending beyond the second surface with the plurality sandwiched therebetween.

9 Claims, 2 Drawing Sheets

5,929,382

WIRE HARNESS ASSEMBLY

TECHNICAL FIELD

This invention relates to flat wire harness assemblies which use Christmas tree retainers for improved attachment.

BACKGROUND ART

Conventional wire harness attaching units requires taping for binding the wires together. Taping also binds clips or retainers to the harness. Taping flat wire harnesses requires more control and care in order to maintain the flat geometry of the harness. Pulling the tape easily bunches the flat profile into a crumbled bundle. Further, the industry has developed a wide variety of clips which require taping to hold them onto the harness. Industry also has developed other ways to attach the clips to the flat harness. The newer attaching units, however, have their own set of problems. The additional components are more costly, both from a materials and labor standpoint. See U.S. Pat. No. 4,9187,261.

Utilizing flat wire harnesses or flat flexible cable (FFC) as a replacement for conventional automotive wire harnesses created a new problem of how to attached the wire harness to the vehicle cost effectively. A method was sought after that could secure multiple layers of FFC together and still function as retainer or clip that could be applied to the vehicle.

DISCLOSURE OF INVENTION

The methods created resulted in an overall time savings for assembly of the product and looks and acts like the same retainer that are on current automotive wire harnesses. Our device utilizes a Christmas tree retainer design to secure multiple layers of flat flexible cable together that can also be used as a securement device into an application. The device also uses a retainer that has a post on its rear side that will be located through the layers of flat flexible cable and heat staked to secure the cable to the retainer.

Multiple flat flexible cables will have holes located in the middle of the cable. The multiple layers will be presented to the operator so that the holes are lined up. A retainer will be pushed through the cable such that the wings on the Christmas tree retainer will lock or hold the cables together. This retainer can be used for retention on the final application (vehicle) or heat staked at another process station to guarantee retention. Another embodiment takes the Christmas tree retainer that has a post on the opposite side of the retainer. The flat cables will be assembled together with the holes aligned and the post on the retainer will be pushed through the flat cables. Once this is done, the post will be heat staked or possibly smashed against the flat cable such that the material that has been moved from the retainer post will be securely holding the layers of cable together.

BEST MODE OF CARRYING OUT INVENTION

Each assembly comprises at least one and usually a plurality of wire harnesses, each wire harness having at least one aperture therethrough, the plurality of wire harnesses having a first surface and a second surface with the plurality sandwiched therebetween. The assembly also includes at least one Christmas tree retainer passing through an aperture of each wire harness in the plurality of wire harnesses, the retainer having a Christmas tree section or end (wings) extending beyond the first surface and a post extending beyond the second surface with plurality sandwiched therebetween.

The Christmas tree end is larger than the apertures and locks the wire harnesses of the plurality together. In another embodiment, the Christmas tree end is heat staked into a mushroom-shaped geometry larger than the apertures. In another embodiment, the Christmas tree end of the retainer has a base that is larger than the apertures and locks the wire harnesses of the plurality together. In still another embodiment, the base end has a post extending away from the plurality beyond the second surface. In this embodiment, the post usually is heat staked into a mushroom-shaped geometry larger than the apertures.

In another embodiment, a motor vehicle interior trim panel has a surface with at least one Christmas tree retainer protruding therefrom. An operator positions a wire harness or harnesses having at least one aperture therethrough adjacent the surface of the trim panel. The Christmas tree section of the retainer of the trim panel passes through the aperture of the wire harness. The Christmas tree end extends beyond the aperture. An operator than can heat stake the Christmas tree extending beyond the aperture to secure the wire harness to the trim panel.

The Christmas tree retainer serves two functions: one to hold the plurality of FFC's together and one to secure the harnesses to the vehicle. Typically, our assembly fastens to the outer door of a motor vehicle or to the outer door side of the trim panel.

Figure 1:
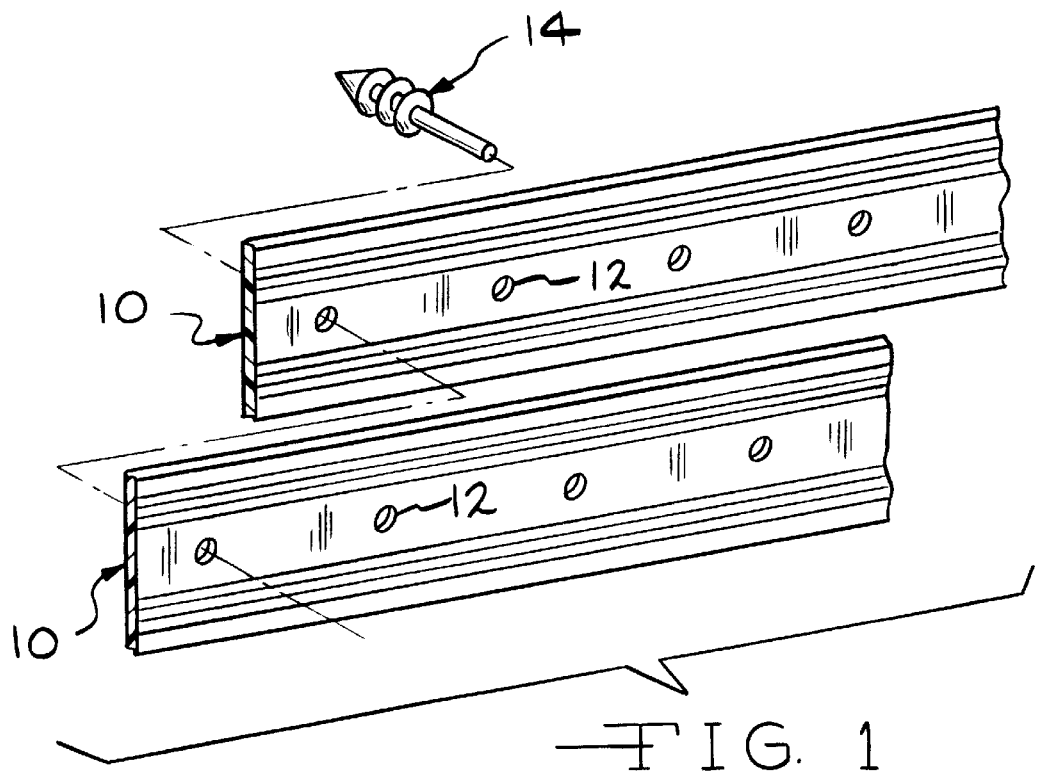
FIG. 1 is a perspective view of the flat flexible cable of this invention.

FIG. 1 shows a plurality of flat wire harnesses or flat flexible cables (FFC) 10 with apertures 12 therethrough.

Figure 2:
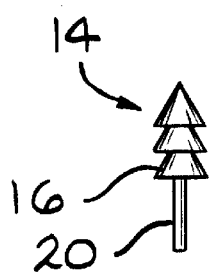
FIG. 2 is a view of the Christmas tree retainer of this invention.

FIG. 2 shows Christmas tree retainer 14 with wings 16 and post 20. Wings 16 are larger then apertures 12. Wings 16 are flexible enough to be inserted through apertures 12 or in the alternative post 20 is passed through aperture 1 2. Wings 1 6 prevent retainer 14 from being removed.

Figure 3:
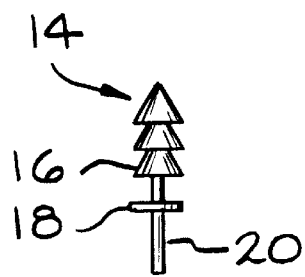
FIG. 3 is a view of a second embodiment of the retainer.
Figure 4:
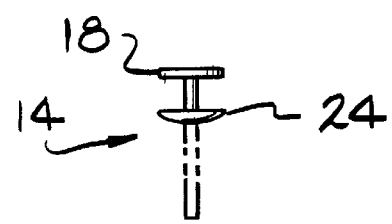
FIG. 4 is a view of this invention showing a heat staked retainer.

FIG. 3 shows retainer 14 with post 20 extending away from base 18. Wings 16 and base 18 are on the same side of FFC 10 for additional security FIG. 4 shows base 18 and post 20 in phantom after heat staking post 20 into mushroom 24 respectively. Wings 16, post 20 or both can be heat staked depending upon the application. In another embodiment, base 18 and post 20 can be used without wings 16.

Figure 5:
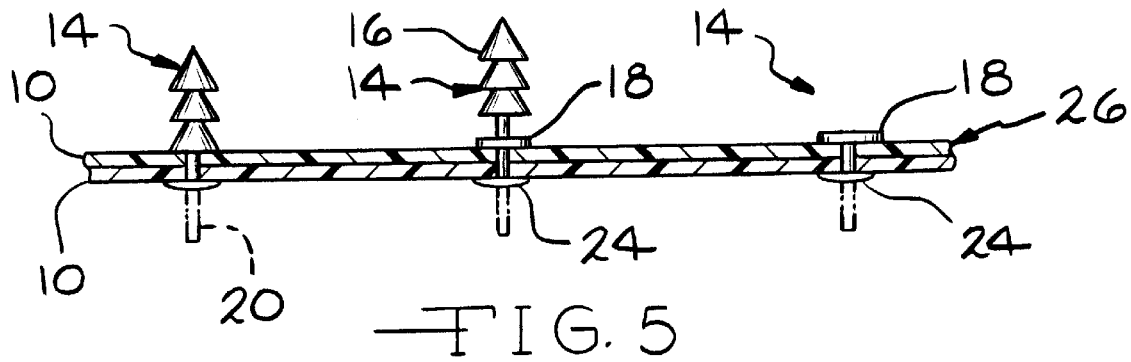
FIG. 5 is a side of multiple FFC's being held together with the retainers of this invention.

FIG. 5 shows assembly 26 with a plurality of FFC's 10. FIG. 5 also shows one retainer 14 with no heat staking, one retainer 14 with base 18 and no heat staking and one retainer 14 with post 20 in phantom heat staked into mushroom 24.

Figure 6:
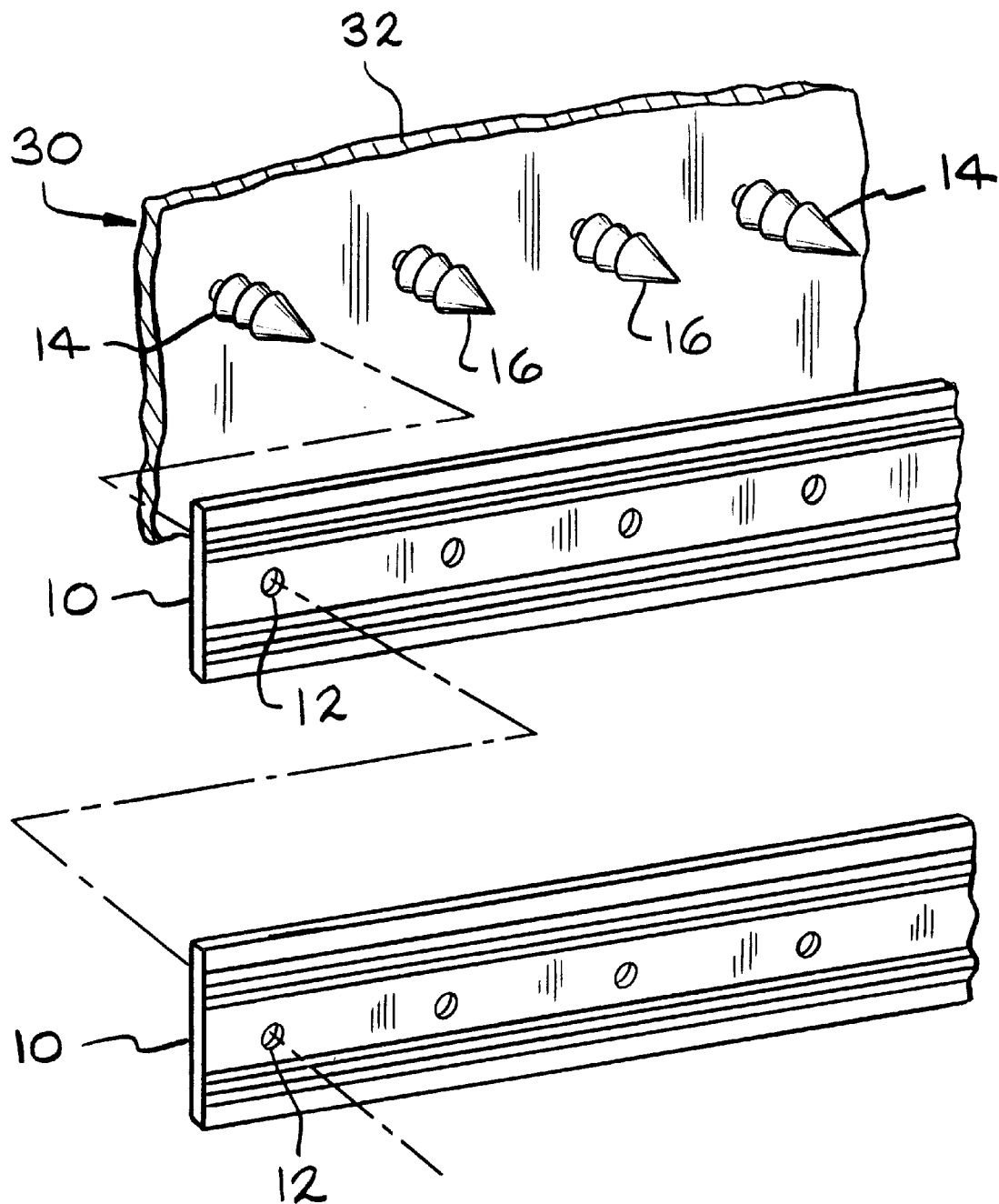
FIG. 6 shows a trim component with Christmas tree retainers molded therein.

FIG. 6 shows assembly 30 which includes interior trim panel 32, Christmas tree retainer 14 protruding therefrom and a plurality of wire harnesses 10. Wire harness 10 includes apertures 12 therethrough. Christmas tree section 16 extends through apertures 12 when wire harness 10 is in place against trim panel 32.

Wire harness 10 typically is a flat wire harness formed by arranging a plurality of parallel wires in a flat state in synthetic resin layers. An insulating covering covers the conductor of each wire. The synthetic resin layers are formed of a polyester resin. The resin can vary depending on the application. Polyvinyl chloride, nylon, polypropylene, polyethylene and the like also could be used. The wires and the synthetic resin layers are joined integrally through laminating.

Heat staking is a common method for mounting a connector or fastener through a hole. The connector typically is a pin, peg or similar protrusion. In heat staking, hot forming tips press against the ends of the peg and melt and deform them against a surface of a board, so the pegs and connector cannot be removed from the board. In our invention, the board or substrate is the wire harness. Heat stake presses with hot forming tips are known in the art. In our invention, this practice involves providing thermoplastic stakes on the door side of an interior trim panel. The thermoplastic stakes insert through complementary openings along the length of the wire harness. The distal ends of the stakes are heated to form a mushroom type geometry on the end of each stake, thereby locking the harness to the panel. In another embodiment, pairs of adjacent stakes are heated to form a unitary connecting bridge instead of the mushroom geometry of a single heat stake. In some applications, the bridge may be a more effective lock than the mushroom. We have found both to be effective in our invention.

The thermoplastic polymers we use for retainer 14 soften when exposed to heat and return to its original condition when cooled to room temperature. Natural substances that exhibit this behavior are crude rubber and a number of waxes; however, the term is usually applied to synthetics such as polyvinyl chloride, nylons, fluorocarbons, linear polyethylene, polyurethane prepolymer, polystyrene, polypropylene, and cellulosic and acrylic resins. For the most part, our invention employs the synthetics.

While we intended our assembly for securing flat wire harnesses to themselves or to a motor vehicle interior trim panel, the assembly can secure harnesses, flat or round, in a wide variety of uses. For example, one can use the assembly in other areas of a vehicle, as well as with industrial equipment. One could easily use the assemblies in the electronics industry with computers, televisions, stereo equipment and the like. One could even use the assemblies in the appliance industry.

We claim:

1. An assembly comprising:
    a plurality of wire harnesses, each wire harness having at least one aperture therethrough, the plurality of wire harnesses having a first surface and a second surface with the plurality sandwiched therebetween; and
    at least one Christmas tree retainer passing through said aperture of each wire harness in the plurality of wire harnesses, the retainer having a Christmas tree section extending beyond the first surface and a post extending beyond the second surface with the plurality sandwiched therebetween, wherein the post is heat staked into a mushroom-shaped geometry larger than each said aperture.

2. An assembly according to claim 1 wherein the Christmas tree section is larger than each said aperture and locks each wire harness of the plurality together.

3. An assembly comprising:
    a plurality of wire harnesses, each wire harness having at least one aperture therethrough, the plurality of wire harnesses having a first surface and second surface with the plurality sandwiched therebetween; and
    at least one Christmas tree retainer passing through said aperture of each wire harness in the plurality of wire harnesses, the retainer having a Christmas tree section extending beyond the first surface and a post extending beyond the second surface with the plurality sandwiched therebetween, wherein the retainer includes a base larger than each said aperture sandwiched between the Christmas tree section and the first surface.

4. An assembly according to claim 1 wherein each wire harness is a flat wire harness.

5. An assembly according to claim 3 wherein the post is heat staked into a mushroom-shaped geometry larger than each said aperture.

6. An assembly comprising:
    a panel having a surface with at least one Christmas tree retainer protruding therefrom; and
    at least one wire harness having at least one aperture therethrough, wherein the wire harness is adjacent the surface of the panel and the retainer of the panel passes through the aperture of the wire harness, wherein the Christmas tree section extends beyond the aperture and is heat staked to secure the wire harness to the trim panel.

7. An assembly according to claim 6 wherein the panel is a motor vehicle interior trim panel.

8. An assembly comprising:
    a plurality of flat wire harnesses, each wire harness having at least one aperture therethrough, the plurality of wire harnesses having a first surface and a second surface with the plurality sandwiched therebetween; and
    at least one Christmas tree retainer passing through said aperture of each wire harness in the plurality of wire harnesses, the retainer having a Christmas tree section extending beyond the first surface and a post end extending beyond the second surface with the plurality sandwiched therebetween, wherein the post end is heat staked into a mushroom-shaped geometry larger than the apertures to secure the flat wire harnesses together.

9. An assembly comprising:
    a plurality of flat wire harnesses, each wire harness having at least one aperture therethrough, the plurality of wire harnesses having a first surface and a second surface with the plurality sandwiched therebetween; and
    at least one retainer passing through the aperture of each wire harness in the plurality of wire harnesses, the retainer having a base end extending beyond the first surface and a post extending beyond the second surface with the plurality sandwiched therebetween, wherein the base end is larger than each said aperture and locks the wire harness of the plurality together and wherein the post is heat staked into a mushroom-shaped geometry larger than the each said aperture.

* * * * *